May 25, 1943. W. ENGEL ET AL 2,320,206

REACTION METHOD

Filed Jan. 22, 1940

Inventors:
Walter Engel
Niels Engel
By: Richardson and Auer
Attys.

Patented May 25, 1943

2,320,206

UNITED STATES PATENT OFFICE 2,320,206

REACTION METHOD

Walter Engel and Niels Engel, Copenhagen, Denmark; vested in the Alien Property Custodian Application January 22, 1940, Serial No. 314,962
In Sweden January 28, 1939

11 Claims. (Cl. 75—40)

This invention relates to a method for effecting an improved reaction between liquids or between solid and liquid substances, and is particularly concerned with such reactions as result in the formation of a liquid or vapor as well as a gas.

A brief review of the principles underlying the invention is rendered below in order to support the understanding of the detailed explanations which are to follow.

We have found that the reaction between solid substances proceeds only at and along relatively small parts of the contacting surfaces thereof, which indicates the reason for the time usually required for complete reaction, and that a considerably increased reaction speed is manifest in the reaction between liquid or gaseous substances with a solid or liquid substance. Reaction accompanied by gas development, especially when carried out at high temperatures, usually shows a very great initial reaction speed which, however, could not be fully realized or maintained by the previously known methods. The reason resides in the fact that, if the reaction material is poured in fluid or liquid condition onto a solid substance, or is stirred into a liquid in the form of powder having particles with relatively large surfaces, there quickly develop, incident to the great initial reaction speed, extremely large amounts of gas with a volume that is frequently a thousand times greater than that of the initial substance. The gas immediately envelops the particles of the initial substance, thereby developing a foam-like bubbling, or it tears the surrounding liquid apart, causing it to boil up in an explosion-like manner. Such reaction cannot be quantitatively controlled, and causes a sharp drop of the reaction speed, thereby increasing the cost of the process.

The surrounding or enveloping of the particles of the initial substance by the reaction gas or product means that an equilibrium condition is being created between the substances which take part in the process. The reaction speed, however, will be great only if the occurrence of an equilibrium condition is continually prevented by immediate and continuous removal of the reaction products so that the initial condition regarding ever-new fresh bodies and substances and ever-new reaction surfaces thereof, which is favorable for the reaction, is maintained.

It must be considered in this connection that an uneconomical decrease in the reaction speed occurs when a solid particle becomes enclosed or enveloped in a gas bubble when it reacts with a liquid because the latter, due to the gas bubble, cannot be fully "active," and the continuous and quick replacement and transfer of substances required for the reaction are therefore impeded. Such occlusion of a particle by a reaction gas occurs, for example, when the particle is immersed in the liquid. The reaction is in such cases considerably slower and usually ceases entirely until the bubble is broken and the particle can again establish direct and unobstructed surface contact with fresh liquid.

These drawbacks are avoided in accordance with the invention by steps causing the particles of a solid substance to react with the liquid while loosely floating upon its surface. The great potential reaction speed can then be fully utilized because a. the gas which is formed in large volume can escape unhindered and without forming bubbles;

b. other reaction products, if soluble, are immediately dissolved in and absorbed by the liquid;

c. insoluble and heavier reaction products sink to the bottom within the liquid; and d. insoluble and lighter reaction products are blown off from the surface by the gas blast, developing incident to the reaction.

It is possible to maintain a substantially constant and uniformly great reaction speed and to utilize the advantages thereof to the fullest extent by suitably dimensioning the grain or particle size, or the size of the drops, and suitably adjusting the feeding thereof in such a manner that all reaction products are instantly removed from the point of reaction, and that the solid particles and the liquid are at the contacting points always substantially equally removed from a condition that would permit the establishing of a chemical equilibrium.

In accordance with the new process, the particles or drops are supplied exclusively to the surface of the liquid which partakes in the reaction and forms a reaction product thereof, the surface forming a definite level on which the reaction is exclusively carried out, and this level or surface is maintained throughout the working of the process. The reaction proceeds extremely fast, nearly explosion-like, and usually yields per time unit greater outputs than heretofore obtained, in spite of the fact that only a relatively small portion of the material, as compared with amounts that are handled in such processes, is at any time subjected to the treatment.

The favorable result is due to the fact that gas-pressure disturbances or crowding of the materials are avoided by the provision and maintenance of the free and unobstructed reaction surface. If an ore grain or particle drops, for example, upon the surface of a melt containing carbon which is dissolved therein, carbon oxide is created by combination with the oxygen of the ore, producing a blast with a strong tendency to expand, and this blast blows the grain, whirling it about the liquid surface, causing other surface portions of the grain to contact the melt and thus supplying fresh melt to the point of reaction. The physical-chemical disturbance of the equilibrium which occurs at the moment of impact of the grain on the reaction surface is thus automatically maintained by the continuous removal of the reaction products.

The new process is technologically based on the recognition of the fact that a liquid surface (liquid mirror) is, in accordance with simple hydro-dynamic laws, supported, moved and renewed by the liquid body which is disposed thereunder, that the liquid transmits to the surface its heat content, and that reaction substances such, for example, as carbon and iron, quickly diffuse through the liquid toward or from the point of reaction. All this is true with regard to the surface level of a homogeneous liquid as well as in the case of a surface created upon a liquid by the reaction process.

The invention will now be explained with reference to the drawing, wherein

Figure 1:
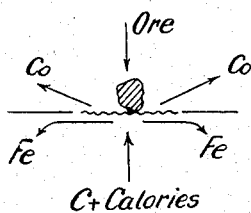
Fig. 1 is a diagram illustrating an example of the invention.

Referring now to Fig. 1, it is assumed that an ore grain (which also could be a small drop) has fallen upon the surface level of a bath of molten iron, for example, high carbon iron. The bath contains elementary iron and also carbon which is dissolved therein. The ore grain at once withdraws from the surface level of the melt at the point of contact the quantity of carbon necessary for its reduction. This quantity of carbon forms a large volume of carbon oxide which freely escapes upwardly. The carbon oxide blast developed thereby whirls the ore grain upon the liquid surface, whereas the spent melt flows away in all directions, forming an annular whirl, and fresh melt rises to the surface below the grain. A corresponding amount of iron reduced from the ore grain sinks downwardly and is replaced at once by fresh carbon-containing iron of a heat content necessary for the reaction.

Figure 2:
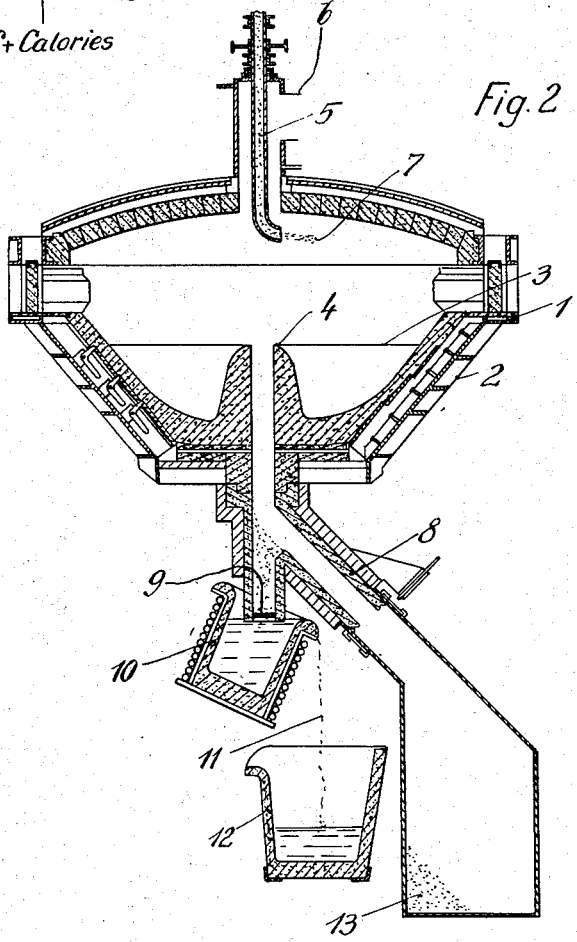
Fig. 2 shows an induction furnace for carrying out the method according to the invention.

Due to the action of the induction coil 2 (Fig. 2), the surface level 3 of the melt moves from the edges toward the centrally disposed overflow 4. Ore grains are spread or dropped onto the outer edges of the surface level 3 by means of the feeder 5 which is rotatably mounted, as shown. The previously described reaction now takes place upon the surface of the bath. The carbon oxide escapes freely by way of the gas outlet 6, and the liberated iron enters in liquid condition into the melt. The ore grain diminishes in size and whirls toward the overflow 4 acted upon by the gas blast caused by the reaction and being carried along by the moving surface of the melt. The reaction is carried out so fast that slag-like components of the ore need not melt, but form in a correctly composed material containing, for example, a sufficient amount of lime, a so-called "dry slag." The formation of this dry slag is a characteristic feature of the invention as applied to the reduction of iron, because the surface level of the melt must always be free for the reception of fresh ore grains, which means that the surface level is not allowed to be covered by liquid slag. This dry slag does not emulsify with the melt, but flows off by way of overflow 4 and may be discharged by way of the slag channel 8 to be collected in the slag container 13. The melt of the ore may be discharged by way of a suitable filter 9 into a container 10 which may be heated, if necessary. The so-called filter may be merely a screen which prevents the slag from dropping down into container 10. From this container the finished molten product flows in the form of a stream 11 into a container 12. The carbon necessary for the reduction may be supplied together with the ore by way of the rotable feeder device 5. The size of the ore is determined by the speed of the movement over the surface level of the melt and by the requirement to maintain always a fresh surface level for receiving the grains fed thereto. The dry slag produced in the process forms on the reaction surface a fine powder intermingling with the ore grains. Its removal may be assisted, if desired, by suitable means, for instance, by means producing a blowing or suction effect.

The size of the grain or the drop of the material to be treated upon the surface level of the melt may, of course, vary within rather wide limits; for instance, it may be pulverulent of an average size of 1–2 mm., or may form small lumps of a somewhat larger size. In each case the size to be ascertained by preliminary tests and to be adapted to the reaction capacity of the ore must allow an easy withdrawal of the gas and prevent sinking into the liquid. The size of the grain must also agree with the necessity of a continuous reduction at the flowing surface level of the melt in such a manner that the reduction of the ore grain is completed at the overflow, whereas at the point of supply the previously treated ore grain has just cleared the way for the fresh grain. The reaction and the removal of gas, respectively, may be assisted by withdrawing the gases developed, for example, by operating with vacuum. With the strong development of gas the operation may also be carried out with a certain pressure above atmospheric, whereby the access of harmful foreign gases to the surface level of the melt is excluded.

The floating of the ore grains on the surface level of the melt may be facilitated by supplying together with the reaction mixture, a substance which either acts upon the surface tension, or upon the viscosity of the melt. Such substances, for instance, in connection with metallurgic melts, are alkaline earths or lime, or in connection with an aqueous liquid, octyle alcohol.

In this manner the operation may be carried out continuously and highly economically. The free surface level of the melt is continuously supplied with grains or drops without producing any mutual obstruction or crowding, carrying the grains and the dry slag, the grains or drops being continuously and successively subjected to free reaction upon free surfaces over which fresh grains or drops are spread, whereas the reaction gas escapes freely upwardly without being hindered by the slag and without causing boiling-up of the latter. The supply of the heat of reaction required on the surface level or reaction level of the melt may be effected by various devices, for instance, by induction furnace heating, by arc heating, or by interior or exterior gas heating, etc.

The new method may be applied to many metallurgical and chemical production processes. The advantages of the maintenance of a high reduction speed is the general characteristic feature. Tests have shown, for instance, that for the complete reduction of an ore grain of a diameter of 2 mm. five seconds only are required with the new method, and that only 1.5 seconds are necessary for a grain of a diameter of 1.2 mm. The invention furnishes the economically important result that the reaction gas can be caught for industrial use directly and immediately without admixture with foreign gases, and that the speed of the reaction is increased without any additional consumption of heat. The new method allows continuous operation with a speed hardly suspected before, and the utlization of the heat consumption as well as the material to an extent which very closely reaches the theoretical possibilities concerning the required expenditure of energy and substance.

The new method may also be used for the production of alloyed steels. If a metal ore is strewn over the surface level of the melt of a metal such as iron, then this metal ore, after having been reduced by the carbon content of the melt, alloys with the original metal of the melt. Such alloy can therefore be produced directly from the ore of the alloying metal. For instance, if tungsten oxide is strewn onto an iron melt in the previously explained manner, the tungsten formed directly enters into the liquid iron according to the formula:

$$WO_3 + 3C \rightarrow W + 3CO$$

The alloying according to the present method may also be applied in a clear-cut and effective manner to the treatment of small quantities of materials. For example, 550 g. of cast iron free of tungsten may be molten to form a bath, and 225 g. ((FeMn)WO$_4$) mixed (according to the absorbing capacity of the surface level) with a suitable amount, about 100 g. of coke, are then fed to the surface of the bath, yielding 575 g. of steel containing 12.73% W.

Alloy steels containing two or more alloying metals may also be very economically produced by this quick reaction method, directly from their ores. It is, however, important to supply the ores of the alloying metals in such cases in the order of their affinity to oxygen in such a manner that the affinity of the succeeding alloying metal is always higher, so that the oxygen of the succeeding ore is not withdrawn by the metal that was previously reduced, which would cause the reduced metal to oxidize again and to enter into the slag. For example, 400 g. wolframite mixed with 137 g. of coke may be spread upon the surface level of a melt of 700 g. cast iron. After the reaction of these grains is completed, 140 g. of chromite is fed to the surface reaction level. The finished block resulting from the process had a weight of 770 g. and contained

|   | Per cent |
|---|---|
| W | 18.90% |
| Cr | 4.23% |
| C | 0.25% | thus an alloy had been produced which is well adapted for making ordinary high speed steels and which, after the usual de-oxidation may be forged and hardened in a manner similar to that of high speed steels.

The new method may also be used for producing copper or tin, for example, in accordance with the following processes:

$$CuO + C \rightarrow = Cu + CO$$
or
$$SnO_2 + 2C \rightarrow = Sn + 2CO$$
or
$$2CuO + CuS \rightarrow = 3Cu + SO_2$$

The substances mentioned in these processes at the left hand side of the conversion symbol are in a suitable grain size fed to the copper melt in the manner explained before. The reduction proceeds likewise as described, carbon oxide and sulphur oxide escaping in gaseous form, while copper or tin formed by the reaction is deposited in the melt.

The new method may also be used for the production of metals in the form of vapor by reducing the ore of the corresponding metal upon the surface of another metal not alloying with the first mentioned metal. For example, zinc oxide may be fed to the surface of an iron melt in which carbon is dissolved or to which carbon is added, resulting in the reaction $$ZnO + C \rightarrow = Zn + CO$$

from which the zinc may be withdrawn together with the carbon oxide in the form of vapor, the zinc then being condensed from the vapor.

The invention may also be advantageously used for the treatment of complex ores. For example, an ore containing zinc and copper is spread over an iron melt giving off its zinc content together with the carbon oxide in the form of vapor, whereas its copper content enters in a liquid state into the iron melt, forming an iron-copper-alloy. The components of this alloy may be chosen as desired by a suitable proportioning of the reaction substances.

The invention can also be used in the organic and chemical industries. For example, quicker reactions may be obtained in using the invention in the following processes:

concentrated $H_2SO_4 + 2NaCl \rightarrow Na_2SO_4 + 2HCl$
or
concentrated $6HCl + NaClO_3 \rightarrow NaCl + 3H_2O + 3Cl_2$ In these processes the first term at the left of the conversion symbol represents the liquid over which the substance represented by the second term at the left of the conversion symbol is spread in a finely divided state and in the manner previously described. The first term at the right of the conversion symbol is the substance developed which dissolves in the liquid, whereas the last term at the right of the conversion symbol is the freely developing gas.

Another example of the use of the invention may be mentioned in referring to the production of hydrogen in accordance with the following process:

$$3NaOH + Al \rightarrow = Al(NaO)_3 + 3H$$

The aluminum is in this case supplied to the sodium hydroxide melt in the form of a powder or in the form of small chips.

What we claim is:

1. The method of reducing a metallic ore, which consists in preparing a bath containing molten metal of the kind contained in said ore and also dissolved carbon, and in adding the ore to the bath in finely divided particles which are so dimensioned in size that they float on the surface of the bath while reaction takes place between the carbon in the bath and a non-metallic constituent of the ore solely at the points of contact between the ore particles and the surface of the bath.

2. The method of carrying out a reaction between molten cast iron containing carbon dissolved therein and iron ore which consists in adding the iron ore in finely divided form solely to the surface of the melt where it floats while reaction takes place, and in adding an additional substance to produce a pulverulent dry slag as one of the reaction products.

3. The method of reducing a compound which contains a metallic constituent and a non-metallic constituent, which consists in forming a bath containing molten metal of the kind contained in said compound and a reducing agent dissolved therein which is adapted to unite with said non-metallic constituent to form a gas, in adding particles of said compound to the surface of the bath, in floating said particles on the surface of said bath while reaction with said reducing agent takes place, solely at the points of contact between said particles and the surface of the bath, whereby the metallic constituent of the compound is freed and added to the bath, and said gas is liberated above the surface of the bath, and in maintaining the bath at a constant level by overflow from the surface thereof.

4. The method as set forth in claim 3, which includes the step of setting up currents in the bath directed toward the point of overflow.

5. The method of reducing a metallic ore which consists in preparing a bath containing molten metal of the kind contained in said ore and a reducing agent dissolved therein which is adapted to unite with a non-metallic constituent of the ore to form a gas, in distributing the ore in finely divided form over the surface of the bath, and in supporting the ore particles on said surface by surface tension while reaction takes place between said reducing agent and said non-metallic constituent of the ore.

6. The method of reducing a metallic ore, which consists in preparing a bath containing a molten metal having a higher temperature of vaporization than the metal in the ore, said bath also containing a reducing agent dissolved therein which is adapted to unite with a non-metallic constituent of the ore to form a gas, in adding the ore to the surface of the bath in finely divided form, in floating the ore on the surface of the bath while reaction takes place between said reducing agent and a non-metallic constituent of the ore solely at the points of contact between the ore particles and the surface of the bath, and in withdrawing the reduced metal of the ore in the form of a gas.

7. The method of producing metal alloys, which consists in preparing a bath containing one of the metals to be alloyed in molten form and also containing carbon in solution, in adding an ore of the other metal to the bath, in floating the ore on the surface of the bath by surface tension while reaction takes place with said carbon, and in melting the metal in the ore as fast as it is reduced and mixing it with the molten metal in the bath.

8. The method of reducing the ore of a metal having a relatively low temperature of vaporization, which consists in preparing a bath containing molten metal having a high temperature of vaporization, in adding a reducing agent to said bath, in adding the ore in finely divided form to the surface of the bath, in floating the ore on the surface of the bath while reduction is taking place solely at the points of contact between the ore particles and the surface of the bath, and in withdrawing the reduced metal in the form of a vapor.

9. The method of reducing an oxide ore, which consists in preparing a bath containing a solution of carbon in molten metal, in adding the ore to the bath in finely divided form, in floating the ore on the surface of the bath while reaction takes place between the carbon in the bath and the oxygen in the ore, and in regulating the ore feed to the bath so that the particles of ore are spaced apart and free to move on the surface of the bath in response to the generation of gas by said reaction.

10. The method of reducing a metallic ore, which consists in preparing a bath of molten metal having a reducing agent dissolved therein which is adapted to combine with a non-metallic constituent of the ore to form a gas, in continuously distributing finely divided particles of the ore over a part of the surface of the bath, in creating a circulation in the bath to produce movement of the surface away from the area to which the ore is delivered, whereby a clean surface is continuously presented to receive the ore particles, and in regulating the rate of delivery and size of the ore particles so that the ore particles are independently supported on the moving surface of the bath by the surface tension of the molten metal while reaction with the reducing agent takes place.

11. The method of reducing a metallic ore as set forth in claim 10, which includes the step of adding the reducing agent to the bath at a regulated rate to replace the amount thereof that is used up by the reaction.

WALTER ENGEL.
NIELS ENGEL.